Aug. 7, 1962   A. J. HILGERT   3,048,113
FLUID CONDUCTOR MOTORS AND CONTROL DEVICES
EMPLOYING THE SAME
Filed July 2, 1956   2 Sheets-Sheet 1

INVENTOR.
Adolph J. Hilgert
BY
Seegert & Schwalbach
Attys

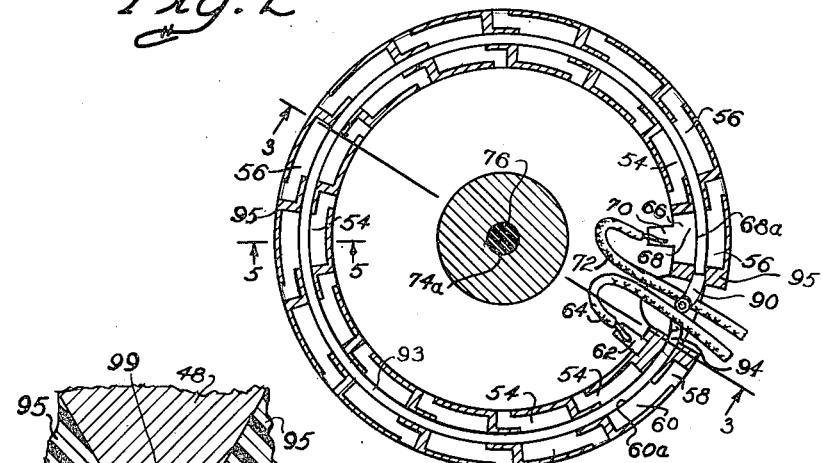
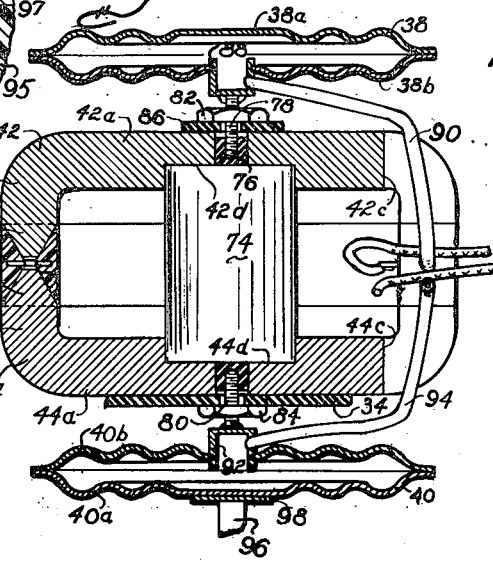

United States Patent Office 3,048,113
Patented Aug. 7, 1962

3,048,113
FLUID CONDUCTOR MOTORS AND CONTROL DEVICES EMPLOYING THE SAME
Adolph J. Hilgert, Milwaukee, Wis., assignor, by mesne assignments, to Penn Controls, Inc., Goshen, Ind., a corporation of Indiana
Filed July 2, 1956, Ser. No. 595,195
4 Claims. (Cl. 103—1)

This invention relates to fluid conductor motors and apparatus including a control device employing a fluid conductor motor. More particularly, the present invention teaches the construction of a novel fluid conductor motor for use with a source of relatively small electric power such as a thermoelectric generator, and the combination of such fluid conductor motor with a control member for operation of the latter between various controlling positions in accordance with energization of the former.

Heretofore, fluid conductor motors have been constructed with stainless steel tubing between the electrical and magnetic poles to provide a passageway for electrically conductive fluid such as mercury. Such tubing was considered particularly well suited for this purpose because of its electrical and magnetic properties and because it was relatively immune to chemical reaction with the mercury. Fluid conductor motors constructed in this manner have generally been used with substantial amounts of electrical power and have proved quite satisfactory in operation. However, such existing motors and apparatus were not operable satisfactorily on a relatively small amount of electrical power, as for example, that available from a thermoelectric generator.

Accordingly the primary object of this invention is to provide fluid conductor motor apparatus operable on very small amounts of electrical power, and more specifically, the power available from a thermoelectric generator.

More specifically, it is an object of this invention to provide a fluid conductor motor having a relatively small electrical gap between electrical pole pieces for efficient utilization of relatively small electrical power.

Another object is to provide a fluid conductor motor wherein the only electrical current path from one electrical pole piece to another comprises the electrically conductive fluid.

Another object is to provide a fluid conductor motor wherein the pole faces of the electrical and magnetic pole pieces form the sides of the passageway for the electrically conductive fluid to afford maximum utilization of the electrical and magnetic energy in exerting a force on the electrically conductive fluid.

Another object is to provide a fluid conductor motor wherein the pole faces of the electrical and magnetic poles form a portion of the fluid passageway for the electrically conductive fluid as above described, and wherein the magnetic pole faces are coated with electrical insulating material to prevent current flow from the fluid to the magnetic pole pieces.

Another object is to provide a fluid conductor motor wherein metallic, for example, copper electrical pole pieces form the sides of a passageway for the electrically conductive fluid, such as mercury, and wherein the pole faces of the electrical pole pieces are plated or coated with means such as rhodium to prevent amalgamation or other chemical reactions between the copper and the mercury.

Another object is to provide a fluid conductor motor having an electric current path the electrical resistance of which can be altered as desired for effectively matching the electrical resistances of the internal and external circuits in such a manner as to increase the efficiency of operation of the fluid conductor motor.

Another object is to provide a fluid conductor motor having a plurality of electrical current paths in the same transverse direction through the electrically conductive fluid for matching the electrical resistance of the motor with the resistance of the source of power, each of said paths also contributing to the total force exerted on the fluid for efficient operation of the fluid conductor motor.

Another object is to provide a control device wherein a movable member is moved from one to another of its operating positions through an hydrostatic accumulator operated by a fluid conductor motor of the character aforedescribed.

Another object is to provide a control device having a control member operatively associated with a pressure responsive actuator, and wherein a fluid conductor motor of the character aforedescribed is employed to alter the pressure within said actuator to cause said actuator to move said control member from one to another of its controlling positions, thereby affording a relatively large amount of work to be done by the control member, though energized from a source of small power.

Another object is to provide condition responsive control apparatus wherein a fluid conductor motor apparatus is operatively associated with a control member, as aforestated, and wherein a thermoelectric generator affords energization of the motor, extinguishment of the heating means for said generator, causing said motor to effect return of said control member from one to another of its controlling positions.

Another object of this invention is to provide control apparatus having a fluid conductor operatively associated with a control member, as above set forth, and wherein the control member is positioned between two extreme controlling positions in accordance with energization of said motor between two extremes thereof.

Another object is to provide control apparatus having a fluid conductor motor operatively associated with a control member, there being an energizing circuit for said motor comprising a source of electric current and a condition responsive circuit controlling device for varying, between two extremes, the current applied to said motor in accordance with variation of a given condition between two extremes thereof, whereby said motor is caused to vary the position of said control member with respect to two extreme positions thereof in accordance with variation of said given condition with respect to its said two extremes.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawings, in which:

FIGURE 2 is a sectional view of the fluid conductor motor taken substantially along line 2—2 of FIGURE 1;

FIGURE 3 is a sectional view of the fluid conductor motor taken substantially along line 3—3 of FIGURE 2;

FIGURE 5 is an enlarged sectional view of one of the sets of electrical and magnetic pole pieces.

Figure 1:
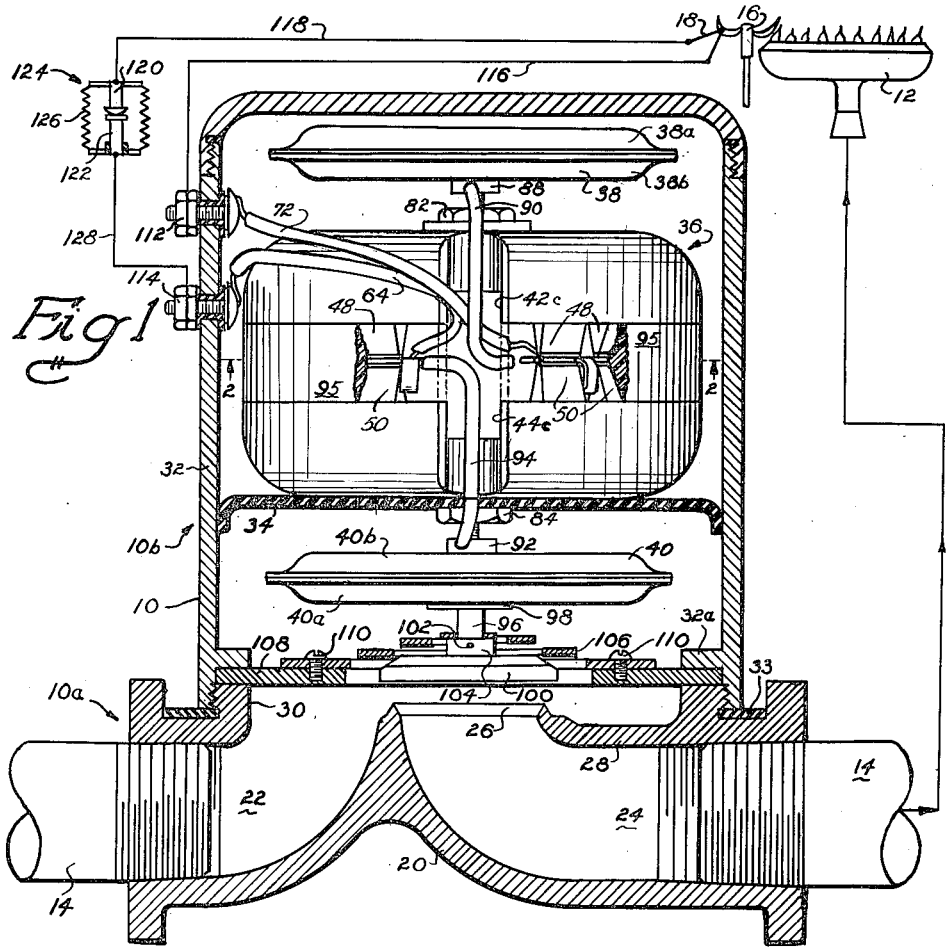
FIGURE 1 is a sectional view of a control device embodying the subject fluid conductor motor, shown more or less schematically, connected with various other components of a control apparatus.

Like reference characters indicate corresponding parts throughout the several views of the drawings taken substantially along line 5—5 of FIGURE 2.

Referring to FIGURE 1 of the drawings, it shows a fluid flow control device 10 connected to a main burner 12 by a section of fluid conduit 14. Positioned adjacent main burner 12 is an ignition or pilot burner 16 supplied from a suitable source of fluid fuel. A thermoelectric generator or thermocouple 18 is positioned adjacent pilot burner 16 for generation of an electric current whenever pilot burner 16 is ignited, as is well understood in the art.

Fluid flow control device 10 comprises a flow control portion 10a and an operator portion 10b for control of fluid flow to main burner 12. Flow control portion 10a comprises a valve body part 20 formed with a fuel inlet 22 threadably fixed to a section of fluid conduit 14 attached to a source of fluid fuel (not shown), and a fuel outlet 24 threadably fixed to the section of conduit 14 which is attached to main burner 12. A valve seat 26 is formed in a partition wall 28 in valve body part 20.

One of the side walls of valve body part 20 is formed with an opening 30 over which operator portion 10b is positioned by threaded engagement between an operator housing 32 and valve body part 20. A gasket 33 is positioned between housing 32 and valve body part 20 to prevent escape of fluid fuel as will hereinafter become apparent. Fixed within housing 32, as by welding or soldering, is a mounting member 34 made of insulating material. Mounted on member 34 is an operator comprising a fluid conductor motor or mercury pump 36, a fluid reservoir 38 and a fluid pressure responsive expansible and contractible actuator 40.

Mercury pump 36 comprises a pair of oppositely disposed cup-shaped magnetic members 42 and 44 each of which is formed of magnetically permeable material such as soft iron and has a main body portion 42a and 44a respectively, and an annular flange-like pole portion 42b and 44b respectively, as shown most clearly in FIGURES 2 and 3. Each of pole portions 42b and 44b is formed with a plurality of salient magnetic poles 48 and 50 respectively. As indicated in FIGURE 1 each of said magnetic poles 48 is aligned with and disposed directly opposite one of said magnetic poles 50 to provide a magnetic gap therebetween. In this manner a plurality of magnetic gaps is provided between the oppositely disposed magnetic members 42 and 44, said magnetic gaps being aligned in accordance with the annular shape of the pole portions 42b and 44b.

Figure 4:
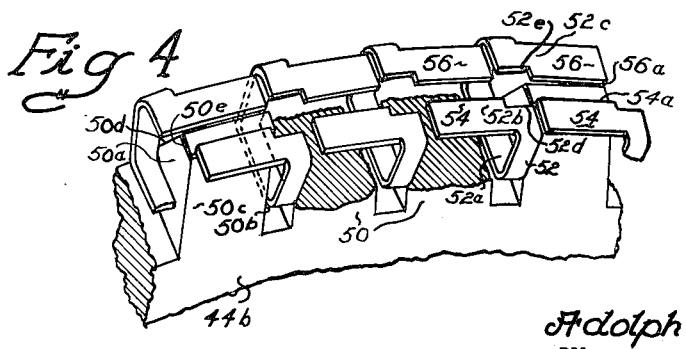
FIGURE 4 is a perspective view of one of the magnet pole pieces and associated electrical pole pieces, certain of the parts being broken away.

Although FIGURE 4 shows the details of construction of the salient magnetic poles of only pole portion 44b, it is to be understood that pole portion 42b is formed substantially identically therewith. Each of the magnetic poles 50 of pole portion 44b is formed with a pair of substantially parallel flat opposite sides 50a and 50b, a pair of angularly disposed substantially flat opposite sides 50c and 50d and a pole face 50e. Each of the magnetic poles 48 is formed with sides and a pole face corresponding to those of magnetic poles 50.

Positioned within each of the spaces between adjacent magnetic poles 50, is an electrical conductor 52 formed of copper and having an intermediate portion 52a formed with four substantially right angle bends and a pair of oppositely offset end portions 52b and 52c, said end portion 52b providing an electrical pole 54 on one side of one of said magnetic gaps and said end portion 52c providing an electrical pole 56 on the other side of the magnetic gap adjacent thereto when conductor 52 is positioned as shown in FIGURE 4.

Each of the electrical poles 54 and 56 is formed with a pole face 54a and 56a respectively whereby, with the conductors 52 positioned as shown in FIGURE 4, the plurality of oppositely disposed electrical pole faces 54a and 56a provide an electrical gap coincident with and at right angles with respect to each of the magnetic gaps afforded by the magnetic pole faces 50e and the oppositely disposed faces of the poles 48. Each of the end portions 52b and 52c of conductor 52 is formed with a notch or cutout 52d and 52e respectively to prevent shorting of electric current from flow across said electrical gaps as will hereinafter become apparent.

As shown in FIGURES 1, 2 and 3, each of magnetic members 42 and 44 is further formed with an opening, 42c and 44c respectively. An electrical conductor 58 formed of copper and having two substantially right angle bends is positioned adjacent opening 44c of member 44. Conductor 58 is further formed with an offset end portion providing an electrical pole 60 having a pole face 60a. The end of conductor 58 opposite said offset end portion provides a terminal portion 62 which, as shown in FIGURES 2 and 3, extends toward the interior of magnetic member 44. One end of a lead wire 64 is fixed to terminal portion 62 as by welding or soldering.

A substantially flat electrical conductor 66 formed of copper and having an enlarged end portion providing an electrical pole 68 having a pole face 68a is positioned adjacent said opening 44c but to the side thereof opposite conductor 58. Conductor 66 is further formed with a terminal portion 70 to which is attached by means such as welding or soldering one end of a lead wire 72. As shown in FIGURE 2, electrical pole 60 is disposed opposite one of the electrical poles 54 to cooperate therewith to provide an electrical gap between pole faces 54a and 60a. Also, electrical pole 68 is disposed opposite one of the electrical poles 56 to cooperate therewith to provide an electrical gap between pole faces 56a and 68a.

In order to retain the salient magnetic poles 48 and 50 in fixed relative positions, and to afford means for magnetic flux flow across the plurality of magnetic gaps, a cylindrically shaped permanent magnet 74 is positioned within openings or depressions 42d and 44d formed respectively in main body portions 42a and 44a of magnetic members 42 and 44. Permanent magnet 74 is formed with a through opening 74a in which is slidably positioned a shaft 76 formed of electrical insulating material. As shown in FIGURE 3, the opposite ends of shaft 76 are formed with threaded holes for individually receiving studs 78 and 80. A nut 82 is provided for stud 78 and a nut 84 is provided for stud 80. In order to electrically isolate the electrical portion of mercury pump 36 from the various other portions thereof, an insulating washer 86 is interposed between nut 82 and magnetic member 42. Magnetic member 44 is positioned on one side of mounting member 34, there being an opening formed in said member 34 to receive stud 80. Nut 84 is positioned adjacent mounting member 34 as shown in FIGURE 3. With studs 78 and 80 threadably engaging their respective openings in shaft 76, and with nuts 82 and 84 drawn up against washer 86 and mounting member 34 respectively, magnetic members 42 and 44, magnet 74 and mounting member 34 are held in a fixed relation.

Fluid reservoir 38 is formed with flexible stainless steel side walls 38a and 38b fastened together along their marginal edges as by welding to provide an hermetically sealed enclosure for expansion and contraction in accordance with the difference between the internal and external pressures as will hereinafter appear. A stainless steel fitting 88 is fixed to stud 78 as by welding and is attached to wall 38b of reservoir 38 by means such as spinning over or crimping the peripheral edge thereof within an opening formed therein. A stainless steel fluid conduit 90 is afforded communication with the interior of reservoir 38 by fastening thereof within an opening formed in fitting 88.

Pressure responsive actuator 40 is formed with flexible stainless steel side walls 40a and 40b fastened together along their marginal edges as by welding and is mounted on stud 80 by means of a stainless steel fitting 92 welded to stud 80 and attached to wall 40b. A stainless steel fluid conduit 94 is fixed within an opening formed in fitting 92 to provide communication between said conduit and the interior of actuator 40.

As shown in FIGURE 2, one end of conduit 90 is positioned adjacent the electrical gap afforded by oppositely disposed electrical poles 56 and 68 and one end of conduit 94 is positioned adjacent the electrical gap afforded by oppositely disposed electrical poles 54 and 60. With conduits 90 and 94 so positioned, a plastic insulating matrix 95 is filled in between and around each of the magnetic poles 48 and 50, and each of the electrical poles 54, 56, 60 and 68 except for the space between the plurality of oppositely disposed magnetic pole faces and oppositely disposed electrical pole faces. Further, an opening is provided in the plastic matrix between each of the combined magnetic and electrical gaps to provide a continuous fluid passageway 93, the space adjacent openings 42c and 44c of magnet members 42 and 44 respectively being filled with plastic matrix to firmly secure the above mentioned ends of conduits 90 and 94 in their positions adjacent the respective electrical gaps. As shown in FIGURE 2, such arrangement provides an hermetically sealed continuous passageway from one end of conduit 94 through the plurality of combined magnetic and electrical gaps and the connecting passages afforded by the openings in the plastic, to one end of conduit 90. For most efficient operation, the cross section of such openings in the plastic matrix between adjacent sets of magnetic and electrical gaps should be substantially the same as the cross section of the combined magnetic and electrical gaps.

Actuator 40, conduit 94, passageway 93, conduit 90 and reservoir 38 are completely filled with electrically conductive fluid such as mercury to prevent formation of oxides of mercury which have a tendency to collect on the electrical poles and lower the resistance across the electrical gaps. Also, since mercury is very active chemically with copper of which the electrical poles are constructed, I prefer to coat the pole faces of each of the electrical poles 54, 56, 60 and 68 and the surfaces adjacent to such pole faces with an inert material such as rhodium 97 to prevent amalgamation between the mercury and the copper. Further, to prevent chemical reaction between the mercury and the various other components which it comes in contact with, I prefer to construct fluid reservoir 38, actuator 40, fittings 88 and 92, and conduits 90 and 94 of stainless steel.

To prevent passage of electric current from the mercury in passageway 93 to the soft iron magnetic poles 48 and 50, I apply to each of the magnetic pole faces 48e and 50e a coating of electrical insulating material such as plastic or ceramic material 99.

As shown in FIGURES 1 and 3, a valve stem 96 is welded to a plate 98 which in turn is welded to the central portion of wall 40a of actuator 40. A valve member 100, for cooperation with valve seat 26, is fixed to valve stem 96 by a pivotal connection afforded by a pin 102 positioned within openings formed in stem 96 and a collar 104. Positioned between valve body part 20 and a shoulder 32a formed in housing 32 is an annular bracket 108. A spring 106, shown in FIGURE 1 as being flat and having a spiral configuration, is fixed to bracket 108 by bolts 110 and engages collar 104 to bias valve member 100 toward seating engagement with valve seat 26. It will be noted that by altering the degree of threaded engagement between stud 80 and the threaded opening in the end of shaft 76, the distance between valve member 100 and valve seat 26 at full open position is altered.

As shown in FIGURE 1, one end of lead wire 72 is electrically connected to an electrical terminal member 112 insulatedly mounted within an opening formed in the side wall of operator housing 32. Also, one end of lead wire 64 is electrically connected to a terminal member 114 which is also insulatedly mounted within an opening formed in operator housing 32. Connected to terminal member 112 externally of housing 32 is one end of a conductor 116, the other end thereof being connected to one of the cold junctions of thermocouple 18. Connected between the other cold junction of thermocouple 18 and terminal member 114 is a circuit comprising conductor 118, relatively movable contacts 120 and 122 of a condition responsive expansible and contractible circuit controlling device or switch 124 and a conductor 128. Switch 124 comprises an expansible and contractible enclosure or bellows 126 having relatively movable opposite end walls to which contacts 120 and 122 are individually connected. I prefer to employ a subatmospheric fill of relatively inert gas to insure disposition of contacts 120 and 122 in disengaged relative positions in the event of rupture or other malfunction of bellows 126. The use of inert gas minimizes decomposition of contacts 120 and 122 and chemical reaction thereof with the fill thereby maintaining the electrical resistance of the surfaces of said contacts relatively small. I prefer to place switch 124 in the space to be heated by main burner 12 so as to afford thermostatic control of the atmosphere therewithin. Although I have shown and prefer to employ a switch having a bellows enclosure filled with inert gas at subatmospheric pressure, it is realized that most any type of condition responsive circuit controlling device may be employed without departing from the spirit of the present invention.

The operation of the subject control device will now be described.

With valve member 100 held in flow-preventing engagement with valve seat 26 by spring 106, fluid fuel is prevented from flowing to main burner 12. In order to ignite main burner 12, it is first necessary to ignite pilot burner 16 to effect heating of the hot junction of thermocouple 18. As is well understood in the art, this causes thermocouple 18 to generate an electrical potential which provides current flow to fluid conductor motor 36 whenever switch 124 calls for heat as evidenced by closure of contacts 120 and 122.

The electrical current flows through conductor 116, terminal member 112, lead wire 72, fluid conductor motor 36, lead wire 64, terminal member 114, conductor 128, contacts 122 and 120 of switch 124 and conductor 118. Such current flows in fluid conductor motor 36 from lead wire 72 through electrical conductor 66, across the electrical gap between electrical poles 66 and 56, through the intermediate portion 52a of conductor 52 to the electrical pole 54 therof, and across the electrical gap between electrical poles 54 and 56. Such current continues to flow through the serially arranged electrical conductors 52 and electrical gaps between oppositely disposed electrical poles 54 and 56 until it reaches the electrical pole 54 disposed opposite pole 60 of conductor 58. At this point such current flows across the electrical gap between poles 54 and 60 and through electrical conductor 58 to the terminal portion 62 thereof and thence to lead wire 64. It will be noted that the electrical current always flows through the mercury in passageway 93 in the same transverse direction with respect thereto.

Magnetic flux is caused to flow from permanent magnet 74 through the mercury in passageway 93 of pump 36 between each of the oppositely disposed magnetic poles 48 and 50. The magnetic paths (FIGURE 3) are provided from the lower end of permanent magnet 74 through magnetic member 44 across the plurality of magnetic gaps between oppositely disposed salient poles 50 and 48, through magnetic member 42 to the upper end of permanent magnet 74. It will be noted that the plurality of magnetic gaps are arranged in parallel and that the magnetic flux flow through the mercury in passageway 93 is at the same point as the electric current flow therethrough but in a direction transverse with respect to both the passageway and the direction of electric current flow.

As is well understood in the art, whenever a magnetic field and an electric current at right angles with respect to each other are passed through a given point in an electrically conductive fluid, a force is exerted on such fluid tending to move the same in a direction which is at right angles to both the direction of magnetic flux flow and the direction of current flow therethrough. Thus with permanent magnet 74 providing a constant continuous flow of magnetic flux through the mercury in passageway 93, the mercury is moved or pumped along said passageway whenever current is caused to flow across the serially arranged electrical gaps. In the device disclosed in the drawings, permanent magnet 74 and thermocouple 18 are so related as to cause the magnetic flux and electrical current to flow through passageway 93 in the proper direction to cause the mercury to be pumped from within actuator 40, through conduit 94, passageway 93 and conduit 90 and into reservoir 38. In this manner, the fluid pressure within actuator 40 is decreased sufficiently to permit atmospheric pressure on the external side of actuator 40 to move flexible wall 40a thereof upwardly (FIGURE 1), thereby moving valve member 100 to its flow-permitting position against the bias of spring 106. Such movement of valve 100 permits fluid fuel to flow from inlet 22 through outlet 24 and conduit 14 to main burner 12 where the fuel is ignited by the flame of pilot burner 16. It is thus seen that main burner 12 is ignited whenever pilot burner 16 is ignited and the space to be heated by main burner 12 is calling for heat.

As will be readily understood by those persons skilled in the art, the distance valve member 100 is moved from its flow-preventing position upon energization of motor 36 by thermocouple 18, is determined by the amount of force developed by said motor and the force of spring 106 or an abutment opposing movement of the valve. Because of this relationship and since the force developed by mercury pump 36 is directly proportional to the amount of current supplied thereto, the valve open position of valve member 100 can be varied in accordance with variations in energizing current for mercury pump 36, provided spring 106 has a positive spring rate. Relating this to the fluid fuel burning apparatus of FIGURE 1, it is seen that the heat afforded by main burner 12 can be varied in accordance with the amount of current permitted by thermostat 124 to flow to mercury pump 36. As the temperature of the sub-atmospheric fill of thermostatic switch 124 varies, the degree of engagement of contacts 120 and 122 and hence the contact resistance therebetween also varies. Such variation in contact resistance effects a change in the overall resistance of the thermoelectric circuit, thereby varying the amount of current flowing to mercury pump 36. In this manner, the disclosed apparatus affords modulation of fuel flow to main burner 12 in accordance with the variations in the temperature to be controlled by thermostatic switch 124.

Upon interruption of current flow through mercury passageway 93, as by disengagement of contacts 120 and 122 or by cooling of thermocouple 18 due to outage of the flame at pilot burner 16, the force tending to move or pump the mercury is instantaneously removed, whereupon the mercury is returned through passageway 93 and conduit 94 to actuator 40 by means such as the pull of gravity. Return of the mercury to actuator 40 causes the fluid pressure therewithin to overcome the atmospheric pressure external thereof to permit spring 106 to return valve member 100 to flow-preventing engagement with valve seat 26. In this manner, fluid fuel flow to main burner 12 is interrupted whenever thermostat switch 124 is satisfied or whenever the flame at pilot burner 16 is extinguished.

Since mercury pump 36 operates continuously during energization thereof, it can perform considerably more work in moving valve member 100, than electrically energized devices, such as solenoid operators, heretofore employed. That is, the use of a thermoelectrically energized solenoid to move a valve member a predetermined distance against a given bias, requires the solenoid to be of sufficiently large size in order to overcome the bias and move the valve such predetermined distance within a predetermined length of time, as governed by the time it takes for the solenoid plunger to make its single stroke. If either the distance of valve movement or the biasing force thereon is to be increased, then the other of such characteristics must be decreased if the solenoid heretofore sufficient to move the valve the aforesaid predetermined distance against its predetermined bias, is to be employed. This is so, since a solenoid operates for only a given length of time irrespective of continuous energization thereof, and hence must accomplish all of its work within that period of time.

The disclosed device, on the other hand, is not so limited since it is capable of doing work during the entire period of time it is energized. Thus, if either the distance of valve movement or the force of the biasing means is to be increased, the other of such characteristics need not be affected, since it is merely necessary that the mercury pump or motor operate for a longer period of time in order to perform the desired work. Thus although mercury pump 36 is limited in the amount of power it can develop when energized from a limited source of power such as a thermocouple, it is capable of developing such power over a longer period of time, thereby performing considerably more work than operators heretofore employed.

Although the device which I have shown and described pumps the mercury away from the fluid pressure responsive actuator 40 to cause the valve member 100 to be moved to flow-permitting position, it is believed that it will be readily apparent to those persons skilled in the art, that other arrangements of the disclosed device may be utilized without departing from the spirit of the present invention.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A fluid conductor pump comprising means defining a circular fluid passageway, an electrically conductive fluid in said passageway, means affording magnetic flux flow through said fluid at spaced intervals along and in a direction normal to the plane of said circular passageway comprising a pair of coaxial cup-shaped magnetic members having open ends parallel with and facing said circular passageway and formed with poles, the poles of one member being aligned with those of the other on opposite sides of said passageway at said spaced intervals to form magnetic gaps across said passageway, and a separate pair of electrodes at each of said spaced intervals in circuit with said fluid on opposite sides of said passageway, said opposing electrodes being aligned radially with respect to the curvature of said circular passageway, and said pairs of electrodes being serially connected such that current flow serially through said pairs of electrodes also flows through said fluid from one of said opposing electrodes to the other in the same transverse direction at each of said spaced intervals.

2. A fluid conductor pump comprising means defining a circular fluid passageway, an electrically conductive fluid in said passageway, means affording magnetic flux flow through said fluid at spaced intervals along and in a direction normal to the plane of said circular passageway comprising a pair of coaxial cup-shaped magnetic members having open ends parallel with and facing said circular passageway and formed with poles, the poles of one member being alined with those of the other on opposite sides of said passageway at said spaced intervals to form magnetic gaps across said passageway, and a cylindrical permanent magnet extending coaxially within and having opposite end portions of opposite polarity in flux conducting engagement with said cup-shaped members, and a separate pair of electrodes at each of said spaced intervals in circuit with said fluid on opposite sides of said passageway, said opposing electrodes being alined radially with respect to the curvature of said circular passageway, and said pairs of electrodes being serially connected such that current flow serially through said pairs of electrodes also flows through said fluid from one of said opposing electrodes to the other in the same transverse direction at each of said spaced intervals.

3. A fluid conductor pump comprising means defining a circular fluid passageway, an electrically conductive fluid in said passageway, means affording magnetic flux flow through spaced intervals along and in one transverse direction with respect to said passageway comprising a pair of similar circular magnetic members each formed with a plurality of poles, said members being coaxially disposed on opposite sides of said passageway with a pole of one alined with a pole of the other at each of said spaced intervals respectively to provide magnetic gaps across said passageway in said one transverse direction, and a separate pair of electrodes at each of spaced intervals in circuit with said fluid on opposite sides of said passageway, said opposing electrodes being alined at an angle with respect to the alinement of said magnetic gaps, and said pairs of electrodes being serially connected such that current flow serially through said pairs of electrodes also flows through said fluid from one of said opposing electrodes to the other in the same transverse direction at each of said spaced intervals.

4. A fluid conductor pump comprising means defining a circular fluid passageway, an electrically conductive fluid in said passageway, permanent magnet means affording unidirectional magnetic flux flow through said fluid at spaced intervals along and in one transverse direction normal to the plane of said circular passageway comprising a pair of similar circular magnetic members each formed with a plurality of poles, said members being coaxially disposed on opposite sides of said passageway with a pole of one alined with a pole of the other at each of said spaced intervals respectively to provide magnetic gaps across said passageway alined in said one transverse direction and a separate pair of electrodes at each of said spaced intervals in circuit with said fluid on opposite sides of said passageway, said opposing electrodes being alined at an angle with respect to the alinement of said magnetic gaps and radially with respect to the curvature of said passageway, and said pairs of electrodes being serially connected such that current flow serially through said pairs of electrodes also flows through said fluid from one of said opposing electrodes to the other in the same radial direction at each of said spaced intervals.

References Cited in the file of this patent

UNITED STATES PATENTS

| | | |
|---|---|---|
| 853,789 | Holden | May 14, 1907 |
| 1,792,449 | Spencer | Feb. 10, 1931 |
| 2,615,940 | Williams | Oct. 28, 1952 |
| 2,635,637 | Karrer | Apr. 21, 1953 |
| 2,639,727 | Ray | May 26, 1953 |
| 2,652,778 | Crever | Sept. 22, 1953 |
| 2,686,474 | Pulley | Aug. 17, 1954 |
| 2,741,984 | Lindenblad | Apr. 17, 1956 |
| 2,748,710 | Vandenberg | June 5, 1956 |
| 2,750,461 | Bunch | June 12, 1956 |
| 2,764,095 | Baker | Sept. 25, 1956 |
| 2,787,219 | Werner | Apr. 2, 1957 |
| 2,915,973 | Findlay | Dec. 8, 1959 |
| 2,919,356 | Fry | Dec. 29, 1959 |
| 2,928,349 | Findlay | Mar. 15, 1960 |
| 2,962,718 | Hilgert | Nov. 29, 1960 |

FOREIGN PATENTS

| | | |
|---|---|---|
| 126,947 | Great Britain | Dec. 24, 1919 |
| 528,091 | Great Britain | Oct. 22, 1940 |